(12) United States Patent
Miura et al.

(10) Patent No.: US 10,392,010 B2
(45) Date of Patent: *Aug. 27, 2019

(54) EVACUATION TRAVEL ASSIST APPARATUS

(71) Applicant: DENSO CORPORATION, Kariya, Aichi-pref. (JP)

(72) Inventors: Takeshi Miura, Kariya (JP); Masao Oooka, Kariya (JP); Hiroaki Niino, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,645

(22) Filed: Dec. 8, 2017

(65) Prior Publication Data

US 2018/0099662 A1 Apr. 12, 2018

Related U.S. Application Data

(62) Division of application No. 15/097,678, filed on Apr. 13, 2016, now Pat. No. 9,902,395.

(30) Foreign Application Priority Data

Apr. 16, 2015 (JP) .................................. 2015-084314

(51) Int. Cl.
*B60W 30/08* (2012.01)
*B60W 10/04* (2006.01)
(Continued)

(52) U.S. Cl.
CPC ............. *B60W 30/08* (2013.01); *B60K 28/06* (2013.01); *B60W 10/04* (2013.01); *B60W 10/18* (2013.01); *B60W 10/20* (2013.01); *B60W 30/18* (2013.01); *B60W 40/08* (2013.01); *B60W 2040/0818* (2013.01); *B60W 2540/26* (2013.01);
(Continued)

(58) Field of Classification Search
CPC .............................. B60W 30/08; B60K 28/06
See application file for complete search history.

(56) References Cited

U.S. PATENT DOCUMENTS 9,352,779 B2 * 5/2016 Kindo .................. G05D 1/0088
9,409,517 B2 * 8/2016 Han .......................... B60Q 9/00
(Continued)

FOREIGN PATENT DOCUMENTS

| JP | 2005-145282 | 6/2005 |
|---|---|---|
| JP | 2007-331652 | 12/2007 |

(Continued)

*Primary Examiner* — Alex C Dunn
(74) *Attorney, Agent, or Firm* — Knobbe, Martens, Olson & Bear, LLP

(57) ABSTRACT

An evacuation travel assist apparatus includes a stop lane determination section that determines a stop lane and an evacuation place in the stop lane in which an own vehicle should be urgently stopped when the vehicle drive is detected to be in a state of being not able to drive the own vehicle properly, and a transverse position determination section that determines, as a stop transverse position, a position in a transverse direction of the evacuation place in the stop lane so as to ensure a space for the vehicle driver and passengers to get in and out of the own vehicle safely at a side of the own vehicle.

4 Claims, 7 Drawing Sheets

(51) Int. Cl.
*B60W 10/18* (2012.01)
*B60W 10/20* (2006.01)
*B60W 40/08* (2012.01)
*B60K 28/06* (2006.01)
*B60W 30/18* (2012.01)

(52) U.S. Cl.
CPC ..... *B60W 2710/18* (2013.01); *B60W 2710/20* (2013.01); *B60W 2720/10* (2013.01)

(56) References Cited

U.S. PATENT DOCUMENTS

| | | | | |
|---|---|---|---|---|
| 2004/0155811 A1* | 8/2004 | Albero | ............... | B60K 31/0008 342/70 |
| 2005/0131597 A1* | 6/2005 | Raz | ................ | G07C 5/085 701/29.1 |
| 2010/0217476 A1* | 8/2010 | Kindo | ................ | G05D 1/0088 701/31.4 |
| 2013/0018549 A1* | 1/2013 | Kobana | ................ | B60K 28/06 701/41 |
| 2013/0234844 A1* | 9/2013 | Yopp | ................ | B60Q 9/008 340/435 |
| 2015/0203126 A1* | 7/2015 | Kobana | ................ | B60W 50/12 701/93 |
| 2015/0345961 A1 | 12/2015 | Oooka et al. | | |
| 2016/0121906 A1* | 5/2016 | Matsuno | ................ | B60K 28/10 701/23 |

FOREIGN PATENT DOCUMENTS

| | | |
|---|---|---|
| JP | 2008-37218 | 2/2008 |
| JP | 2009-151522 | 7/2009 |
| JP | 2010-30515 | 2/2010 |
| JP | 2014-24367 | 2/2014 |
| JP | 2015-228089 | 12/2015 |

\* cited by examiner

EVACUATION TRAVEL ASSIST APPARATUS

This application claims priority to Japanese Patent Application No. 2015-84314 filed on Apr. 16, 2015, and is a divisional application of U.S. patent application Ser. No. 15/097,678 filed on Apr. 13, 2016, the entire contents of which are hereby incorporated by reference.

BACKGROUND OF THE INVENTION

1. Field of the Invention

The present invention relates to a technique for evacuating an own vehicle upon detecting reduction of consciousness of the driver of the own vehicle.

2. Description of Related Art

There is known a technique for evacuating an own vehicle to a road shoulder area using a travel assist system to secure the safety of the own vehicle and other vehicles when the level of the consciousness of the driver of the own vehicle is reduced due to drowsiness, for example, or the driver has lost the consciousness for some reason. For example, refer to Japanese Patent Application Laid-open No. 2007-331652.

However, since this technique places importance on avoiding the own vehicle from obstructing the travel of other vehicles in determining a place for evacuation, there may occur a problem that the own vehicle may be parked at a place in which a guardrail or a wall is present and accordingly it is difficult to let a sick person exit from the own vehicle or difficult for the passengers to get out of the own vehicle.

SUMMARY

An exemplary embodiment provides an evacuation travel assist apparatus including:
a driver-state determination section that determines whether or not a vehicle driver of an own vehicle is in a state of being able to drive the own vehicle properly;
an information acquisition section that acquires information regarding a state of the own vehicle and a state of a surrounding environment of the own vehicle;
a stop lane determination section that determines a stop lane and an evacuation place in the stop lane, in which the own vehicle should be urgently stopped based on the information acquired by the information acquisition section when the driver-state determination section determines that the vehicle drive is not in a state of being able to drive the own vehicle properly;
a transverse position determination section that determines, as a stop transverse position, a position in a transverse direction of the evacuation place in the stop lane so as to ensure a space for the vehicle driver and passengers to enter and exit the own vehicle safely at a side of the own vehicle; and
an evacuation travel control section that causes the own vehicle to travel to the evacuation place depending on the stop lane determined by the stop lane determination section and the stop transverse position determined by the transverse position determination section.

According to the exemplary embodiment, there is provided an evacuation travel assist apparatus that enables causing a vehicle to travel to an evacuation place in which the vehicle driver and passengers can get in and out of safely without obstructing the travel of other vehicles.

Other advantages and features of the invention will become apparent from the following description including the drawings and claims.

PREFERRED EMBODIMENTS OF THE INVENTION

Figure 1:
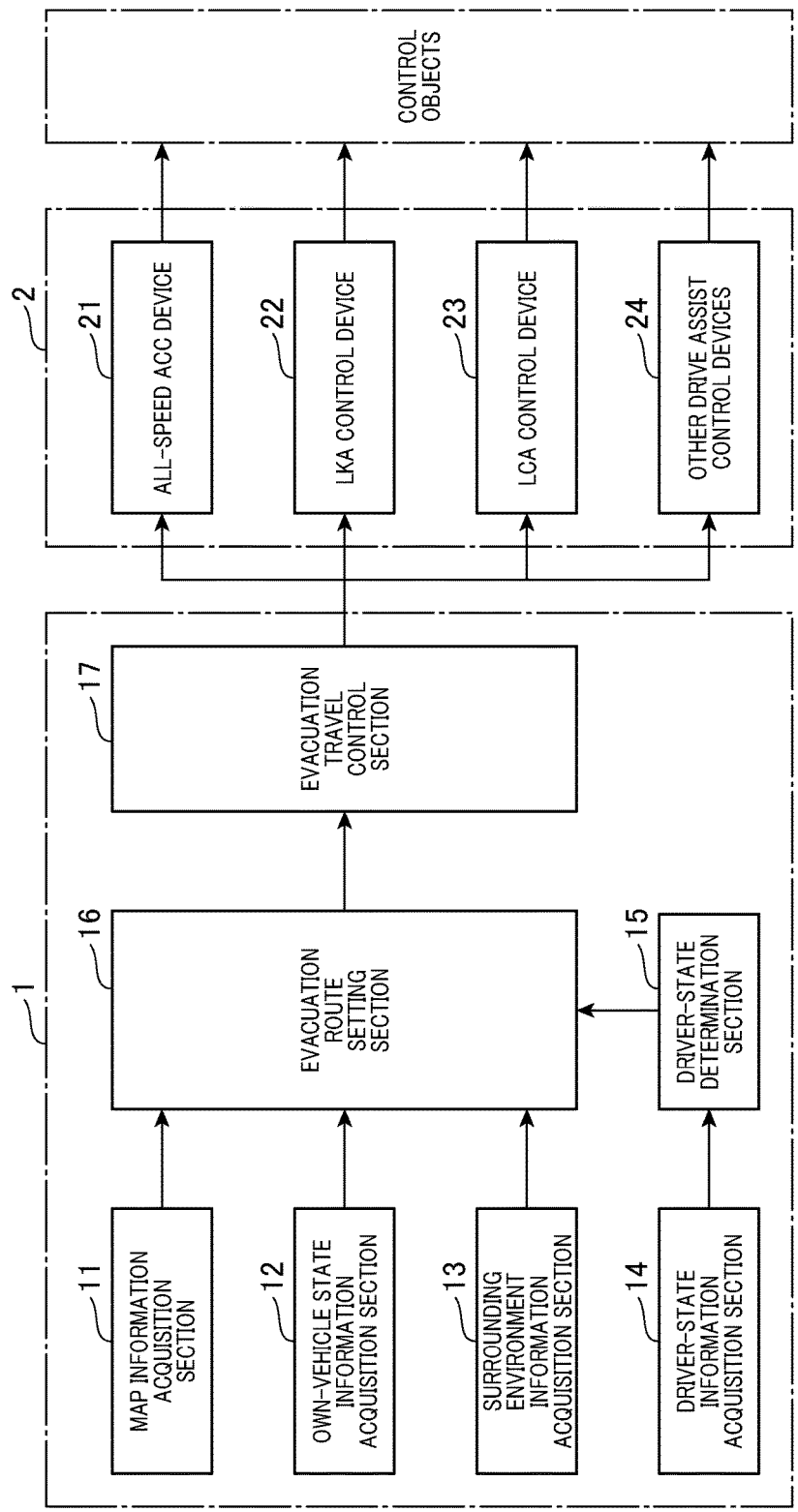
FIG. 1 is a block diagram showing the structure of an evacuation travel assist apparatus according to an embodiment of the invention and the structure of an apparatus which cooperates with the evacuation travel assist apparatus.

An evacuation travel assist apparatus 1 according to an embodiment of the invention is described with reference to the drawings. The evacuation travel assist apparatus 1 shown in FIG. 1 is for assisting a vehicle driver to drive a vehicle (referred to as the "own vehicle" hereinafter) to a safe evacuation place and park the own vehicle there in cooperation with a drive assist system 2 mounted on the own vehicle if the vehicle driver is assumed not to be in a state of being able to properly drive the own vehicle.

The drive assist system 2 includes an all-speed ACC (adaptive cruise control) device 21, an LKA (lane keep assist) control device 22, an LCA (lane change assist) control device 23 and other drive assist control devices 24. The drive assist control devices 24 may include an anti-lock brake system, a collision damage reducing system, or a stability control system.

These control devices 21 to 24 constituting the drive assist system 2 are implemented as ECUs, and are connected to the evacuation travel assist apparatus 1 through an in-vehicle LAN. Normally, the control devices 21 to 24 operate in accordance with instructions or driving operation of the vehicle driver. However, when they receive instructions regarding evacuation travel from the evacuation travel assist apparatus 1, they operate in accordance with these instructions. For example, the control devices 21 to 24 perform data calculation necessary for deceleration control, lane keep control, lane change control or collision prevention control taking into account the speed of the own vehicle, road alignment, presence or absence of a succeeding vehicle and so on. The drive assist system 2 controls various control objects based on the results of the data calculation so that the acceleration control, brake control and steering control are performed for each of the control objects to achieve desired motion control of the own vehicle. Since the various control devices constituting the drive assist system 2 are well known, further explanations of them are omitted here.

Next, the evacuation travel assist apparatus 1 is described. The evacuation travel assist apparatus 1 includes a map information acquisition section 11, an own-vehicle information acquisition section 12, a surrounding environment information acquisition section 13, a driver information acquisition section 14, a driver-state determination section 15, an evacuation route setting section 16 and an evacuation travel control section 17.

The map information acquisition section 11 acquires map information for an area which the own vehicle may run through. The map information includes a road alignment information (a curvature and a slope and their change pints, for example), lane information (the number of lanes, and lane type such as a traveling lane, a passing lane, a climbing lane, an evacuation route, a road shoulder, a left turn or right turn lane, a merging lane, an exit lane and so on), junction point information (an intersection, a junction, a crosswalk, a railroad crossing and so on), and road boundary information (a guard rail, a wall, a side ditch, a pole, a block, a fence, a cliff and so on). Such map information may be stored in a storage device in the own vehicle, and/or acquired from outside the own vehicle through data communication.

The own-vehicle information acquisition section 12 acquires, as own-vehicle information, information regarding the state of the own vehicle. The own-vehicle information includes information regarding the operation state of the direction indicator, vehicle speed, vehicle acceleration (deceleration) and operation amount of steering of the own vehicle, which can be obtained from sensor signals of a direction indicator sensor, a speed sensor, an acceleration sensor and steering angle sensor, respectively.

The surrounding environment information acquisition section 13 acquires, as surrounding environment information, information regarding objects present around the own vehicle. The surrounding environment information includes information regarding a distance to each object, a relative speed of each object, a current position of each object and so on which can be obtained by an image sensor, a radar sensor, a GPS sensor, a locator and so on. The surrounding environment information includes also various information (the number of the lanes and the lane in which the own vehicle is running, for example) which can be obtained by image-processing images supplied from an image sensor.

The driver information acquisition section 14 acquires, as driver information, information used for determining whether the vehicle driver is in a state of being able to drive the own vehicle properly. The driver information includes information regarding the feature quantity of the face or eyes of the vehicle driver which can be extracted from images of the vehicle driver imaged by a camera, for example, the steering angle which directly reflects the driving operation by the vehicle driver and is detected by the steering angle sensor, and biological information such as the blood pressure and the body temperature of the vehicle driver obtained by sensors worn by the vehicle driver.

The driver-state determination section 15 determines whether or not the vehicle driver is in a state of being able to drive the vehicle properly by estimating the level of the consciousness of the vehicle driver based on the driver information acquired by the driver information acquisition section 14.

The evacuation route setting section 16 sets an evacuation place at which the own vehicle should be stopped and parked and an evacuation route along which the own vehicle should travel to reach the evacuation place.

The evacuation travel control section 17 generates instructions in accordance with the evacuation place, the transverse position of the evacuation place in an evacuation lane or a lane in which the evacuation place is set, and the evacuation route set by the evacuation route setting section 16. These instructions are sent to the drive assist system 2 to perform evacuation control.

The evacuation travel assist apparatus 1 is formed of a microcomputer including a CPU, memories and so on. The functions of the above described various control sections are implemented by software run by this microcomputer.

Figure 2:
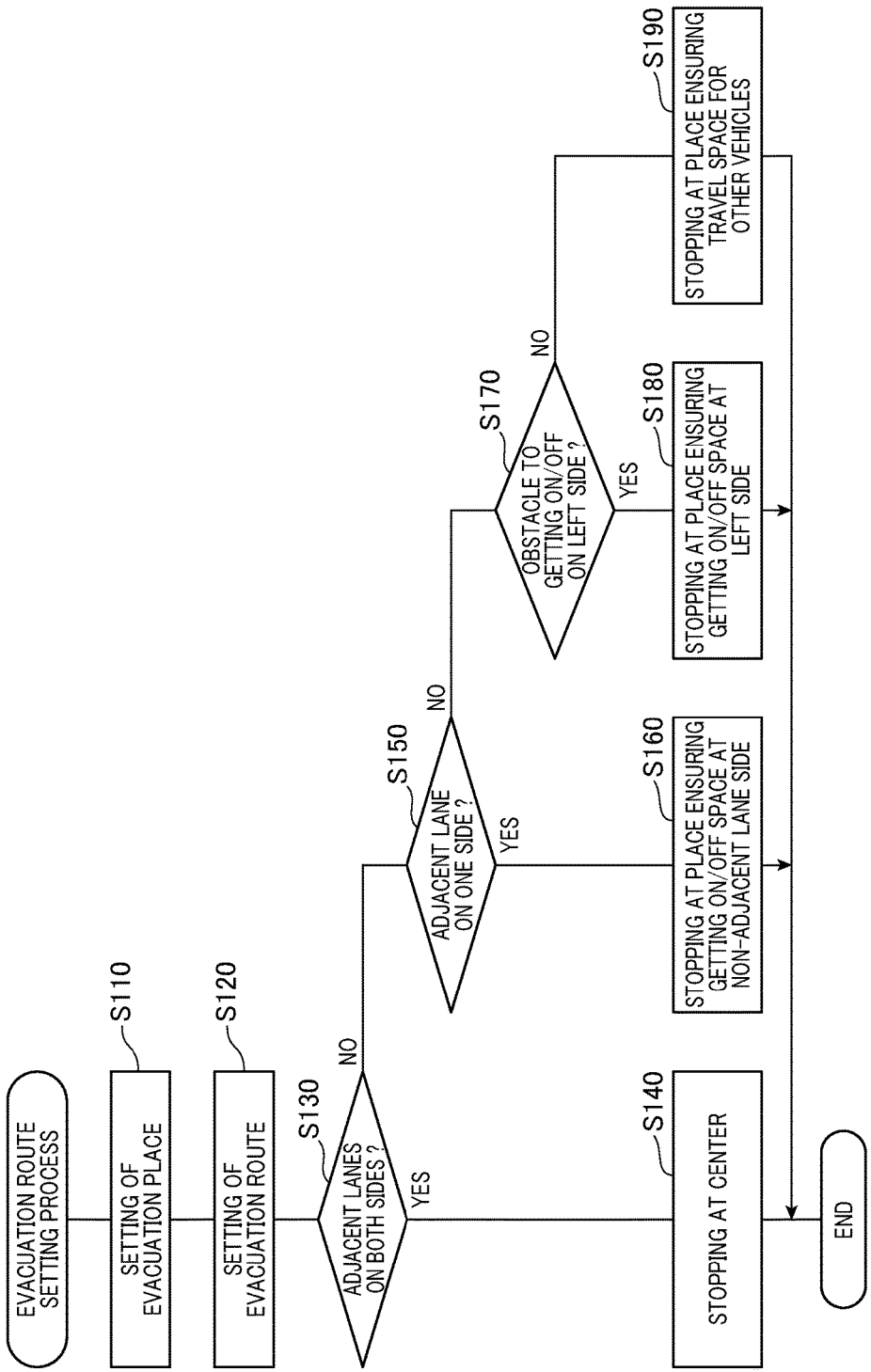
FIG. 2 is a flowchart showing steps of an evacuation route setting process performed by the evacuation travel assist apparatus.

Next, an evacuation route setting process performed by the evacuation route setting section 16 is explained with reference to the flowchart of FIG. 2. This process is started when the driver-state determination section 15 determines that the vehicle driver is in a state of not being able to drive the own vehicle properly and an evacuation travel is necessary.

This process begins in step S110 where the evacuation route setting section 16 identifies the lane in which the own vehicle is running (the running lane hereinafter) and sets a plurality of candidate evacuation places taking into account various risks based on the map information acquired by the map information acquisition section 11, the own-vehicle information acquired by the own-vehicle information acquisition section 12 and the surrounding environment information acquisition section 13. Specifically, the evacuation route setting section 16 marks out a plurality of spots within an area in which the own vehicle may run for each lane and for each of predetermined distances, and evaluates risk levels of these spots in terms of a plurality of different viewpoints, and determines a plurality of candidate evacuation places which have relatively low risk levels. The risks to be evaluated in determining the candidate evacuation places includes a risk which depends on a road shape (a curved road, an intersection and so on) and the environment (presence of a guard rail or protective wall, for example), a risk that occurs when the own vehicle is stopped (for example, a passing lane and a curved lane with a poor view are risky), and a risk of continuing an evacuation travel for a long time.

In subsequent step S120, an evacuation place and an evacuation route are determined based on the map information, the own-vehicle information and the surrounding environment information taking into account potential risks to reach the candidate evacuation places determined in step S110. Specifically, for each of the candidate evacuation places, an optimum route that is lowest in the risk level to reach the candidate evacuation place is detected. Then, one of the candidate evacuation places, whose optimum route is the lowest in the risk level, is determined as an evacuation place, and the optimum route to this determined evacuation place is determined as an evacuation route. The risks to be considered in determining the evacuation place and the evacuation route includes a risk of route change (abrupt route change or route change in a curved road is risky), and a risk of making a stop (a place which requires heavy braking to stop is risky).

The technique for determining such an evacuation place and an evacuation route based on the risk levels is described in detail, for example, in Japanese Patent Application Laid-open No. 2014-112900. Accordingly, further detailed explanation of this technique is omitted.

In subsequent step S130, it is determined whether or not there are adjacent lanes on both sides of the evacuation lane (the lane in which the evacuation place determined in step S120 is present). If the determination result in step S130 is affirmative, the process proceeds to step S140, and otherwise proceeds to step S150. Here, the adjacent lanes include the own lane (the lane in which the own vehicle is running) and the opposite lane. However, if the own vehicle cannot run into the opposite lane due to a median strip or the like, this opposite lane is not regarded as the adjacent lane.

In step S140, a position in the width direction in the evacuation lane at which the own vehicle should be stopped (this position being referred to as the "stop transverse position" hereinafter) is set at the center of the evacuation lane. Then, this process is terminated. In step S150, it is determined whether or not there is an adjacent lane only on one side of the evacuation lane. If the determination result in step S150 is affirmative, the process proceeds to step S160, and otherwise proceeds to step S170.

In step S160, a position in which a space of a required size for getting on and off the own vehicle can be ensured between the own vehicle and the edge of the evacuation lane on the side where there is no adjacent lane is set as the stop transverse position. Then, this process is terminated.

The required size of the space for getting on and off the own vehicle is set depending on the door type of the own vehicle (hinge type or slide type, for example). In step S170, it is determined whether or not an obstacle to getting on and off is present on the left edge of the evacuation lane. The obstacle to getting on and off may be an artificial construction such as a guard rail or a wall, or a natural obstacle such as a cliff.

If the determination result in step S170 is affirmative, the process proceeds to step S180, and otherwise proceeds to step S190. In step S180, a position in which a space for getting on and off the own vehicle can be ensured between the own vehicle and the left edge of the evacuation lane is set as the stop transverse position. Then, this process is terminated.

Figure 3:
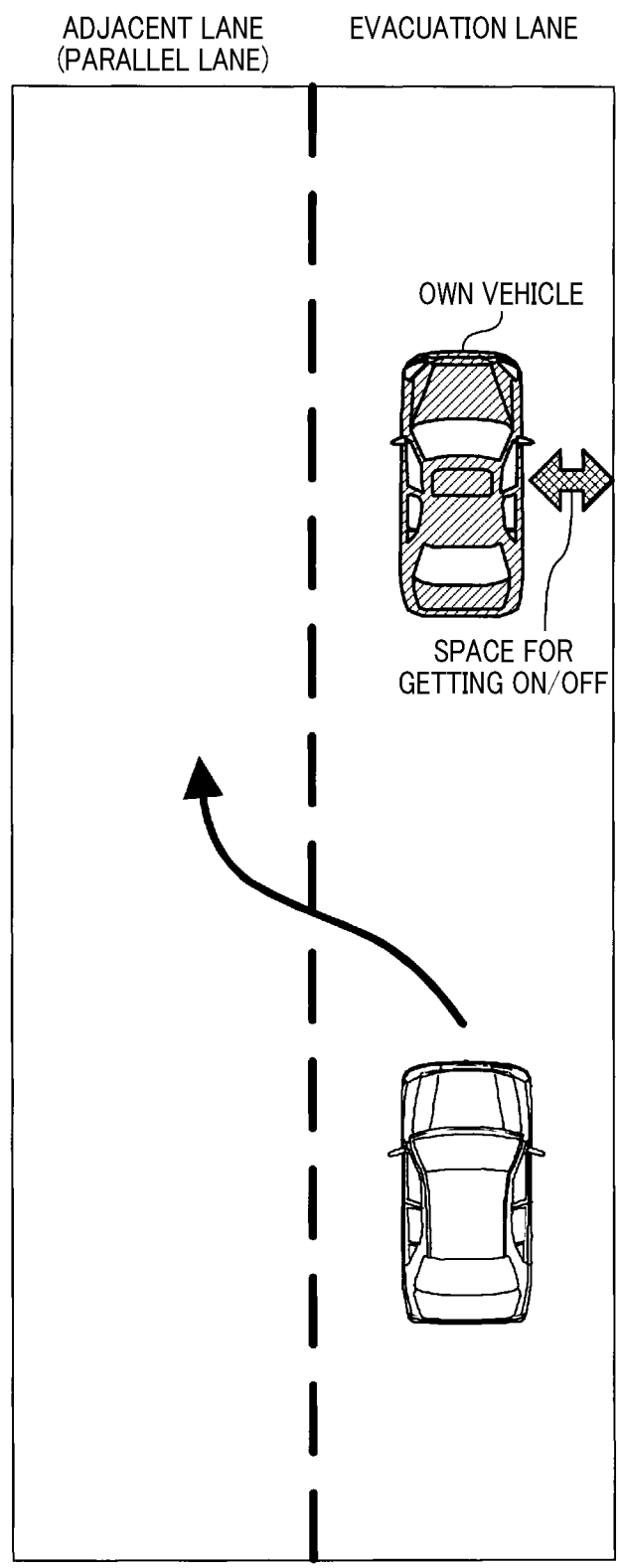
FIG. 3 is a diagram showing a stop transverse position when there is an adjacent lane (a parallel lane) on one side of a stop lane.
Figure 4:
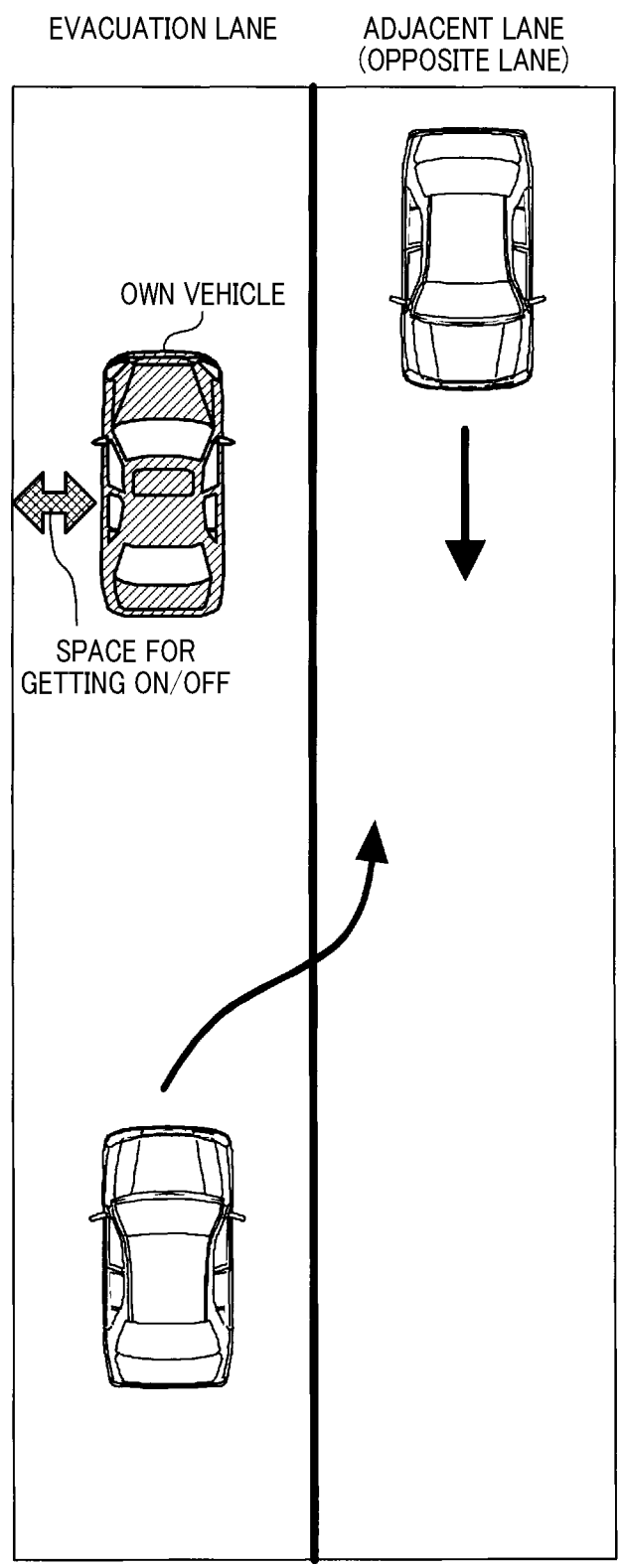
FIG. 4 is a diagram showing a stop transverse position when there is an adjacent lane (an opposite lane) on one side of a stop lane.

In step S190, a position in which a space for getting on and off the own vehicle can be ensured between the own vehicle and the right edge of the evacuation lane is set as the stop transverse position. Then, this process is terminated. According to the evacuation travel assist apparatus 1 described above, when an adjacent lane is present only on one side of the evacuation lane, a position in which a space for getting on and off the own vehicle can be ensured between the own vehicle and the edge of the evacuation lane on the side opposite to the adjacent lane is set as the stop transverse position as shown in FIGS. 3 and 4. That is, when an adjacent lane is present, it is possible to ensure a space for getting on and off the own vehicle while ensuring a space for other vehicles to run. In this case, the driver and passengers can get in and out of the own vehicle safely without obstructing the travel of other vehicles.

Figure 5:
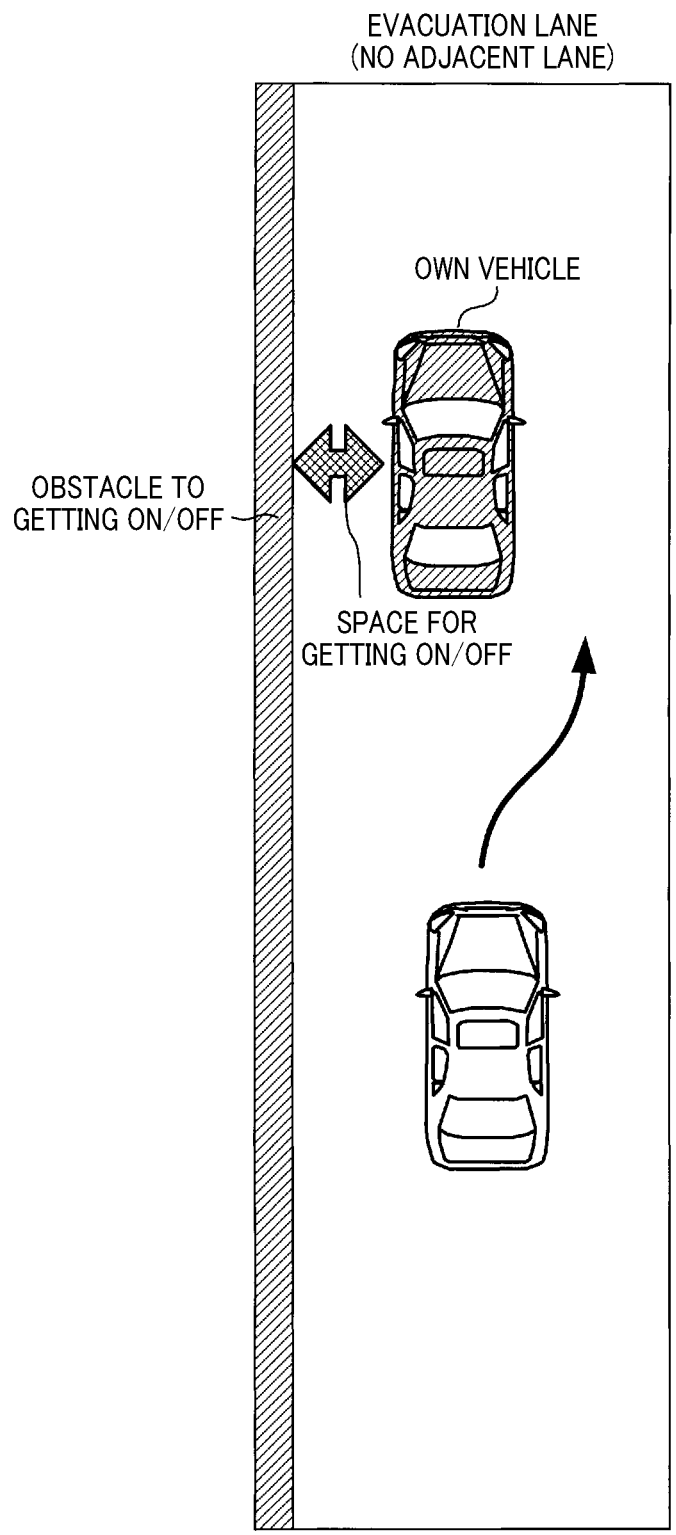
FIG. 5 is a diagram showing a stop transverse position when there is no adjacent lane in either side of a stop lane, and there is an obstacle to getting on and off at the end of a driveway apron.
Figure 6:
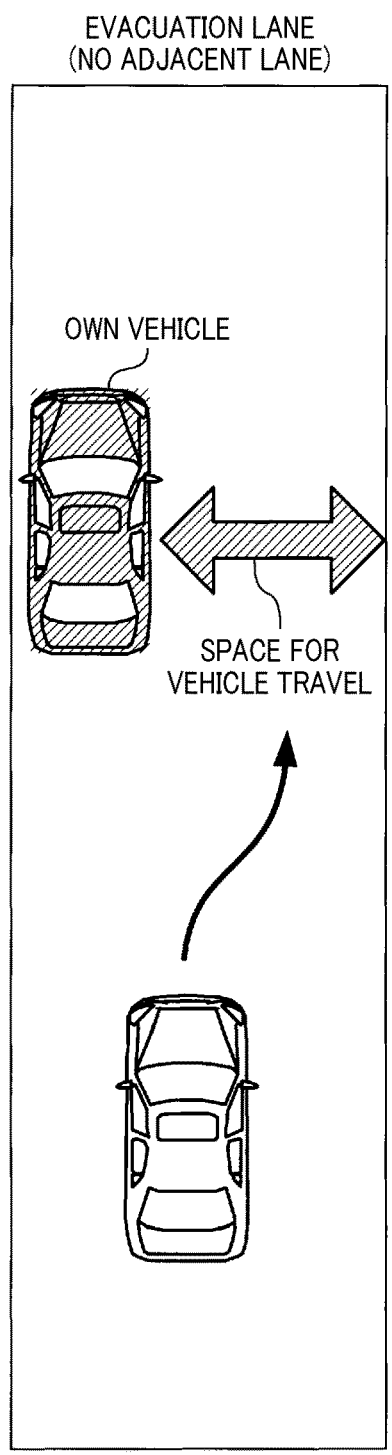
FIG. 6 is a diagram showing a stop transverse position when there is no adjacent lane in either side of a stop lane, and there is no obstacle to getting on and off.
Figure 7:
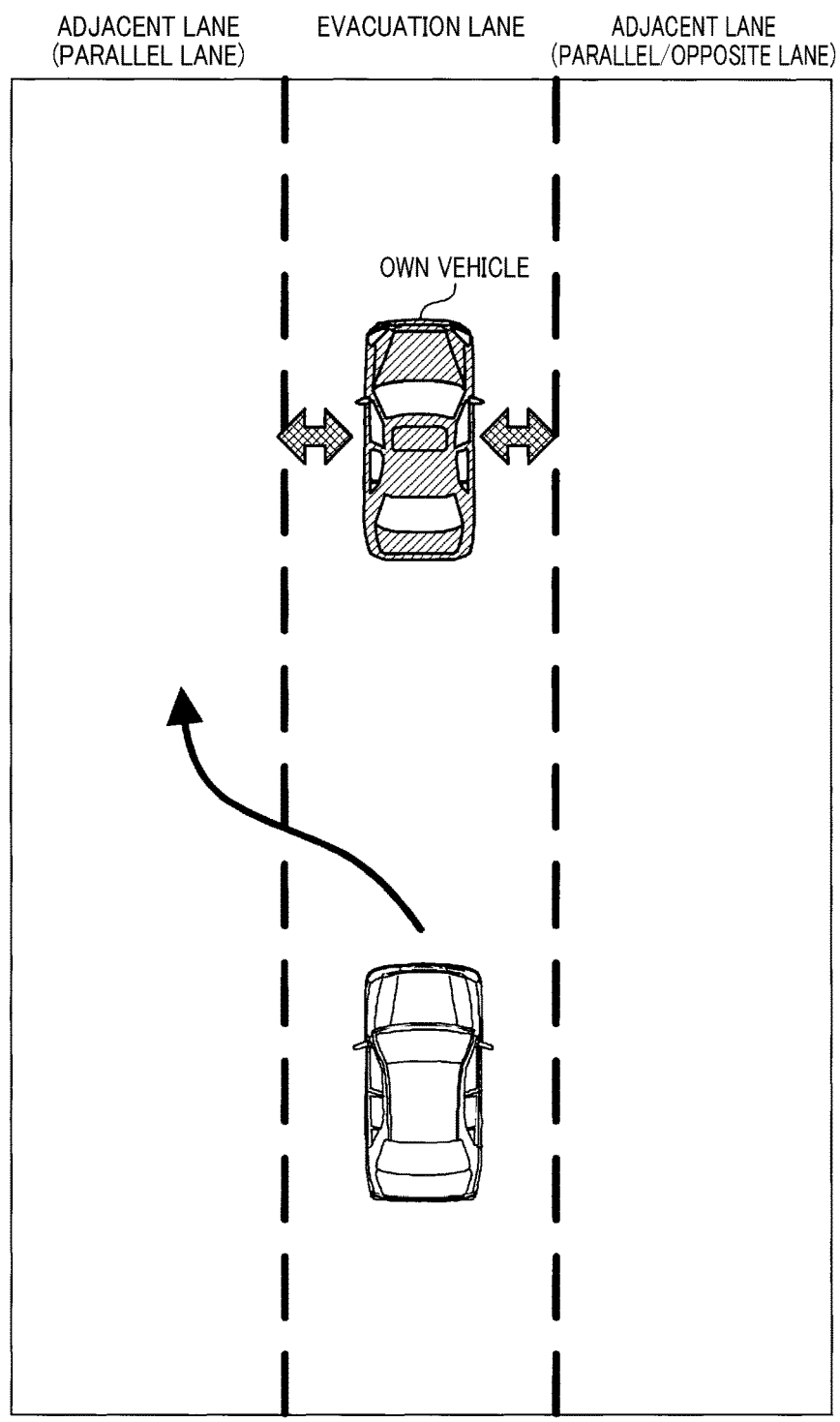
FIG. 7 is a diagram showing a stop transverse position when there is an adjacent lane at each side of a stop lane.

When an adjacent lane is not present on either side of the evacuation lane, and an obstacle is present on the left edge of the evacuation lane, the stop transverse position is set giving priority to ensuring a space for getting on and off the own vehicle as shown in FIG. 5. On the other hand, when an adjacent lane is not present on either side of the evacuation lane, and no obstacle to getting and off the own vehicle is present on the left edge of the evacuation lane, the stop transverse position is set giving priority to ensuring a space for other vehicles to run as shown in FIG. 6. This is because, when no obstacle to getting and off the own vehicle is present on the left edge of the evacuation lane, even if the own vehicle is pulled to the left edge of the evacuation lane and parked there, the vehicle driver and passengers of the own vehicle can get in and out of the own vehicle easily. In a situation where the driver and passengers can get in and out of the own vehicle without difficulty although a sufficient space for getting on and off cannot be ensured, since a space for other vehicle to run is ensured with priority, it is possible to prevent obstructing other vehicle from running.

In a rare case where adjacent lanes are present on both side of the evacuation lane, the center of the evacuation lane is set as the stop transverse position. This is because if adjacent lanes are present on both sides of the evacuation lane, a space forgetting on and off the own vehicle and a space for other vehicles to run can be ensured without pulling the own vehicle to one edge of the evacuation lane.

Other Embodiments

It is a matter of course that various modifications can be made to the above described embodiment as described below.

In the above embodiment, the evacuation place and evacuation route are determined taking into account the various risks. However, a place satisfying predetermined criteria within a predetermined distance from the own vehicle may be determined as the evacuation place.

The above explained preferred embodiments are exemplary of the invention of the present application which is described solely by the claims appended below. It should be understood that modifications of the preferred embodiments may be made as would occur to one of skill in the art.

What is claimed is:
1. An evacuation travel assist apparatus comprising:
a driver-state determination section, using a processor, that determines whether or not a vehicle driver of an own vehicle is in a state of being able to drive the own vehicle properly;
an information acquisition section, using a processor, that acquires information regarding a state of the own vehicle and a state of a surrounding environment of the own vehicle;
an evacuation route setting section, using a processor, that determines a stop lane an evacuation place in the stop lane in which the own vehicle should be urgently stopped based on the information acquired by the information acquisition section when the driver-state determination section determines that the vehicle drive is not in a state of being able to drive the own vehicle properly, and a stop transverse position, the stop transverse position being a position in a transverse direction of the evacuation place in the stop lane so as to ensure a space for the vehicle driver and passengers to enter and exit the own vehicle safely at a side of the own vehicle; and
an evacuation travel control section, using a processor, that causes the own vehicle to travel to the evacuation place in the stop lane depending on the stop lane and the stop transverse position determined by the evacuation route setting section,
wherein, when an adjacent lane is present on one side of the stop lane, the evacuation route setting section determines, as the stop transverse position, a position which is between the own vehicle and an edge opposite to the adjacent lane of the stop lane and in which a space for getting on and off the own vehicle is ensured, and
wherein, when no adjacent lane is present on either side of the stop lane, and an obstacle to getting on and off the own vehicle is present on a left edge of the stop lane, the evacuation route setting section determines, as the stop transverse position, a position which is between the own vehicle and a left edge of the stop lane and in which a space for getting on and off the own vehicle is ensured.

2. The evacuation travel assist apparatus according to claim 1, wherein, when no obstacle to getting on and off the vehicle is present, the evacuation travel control section causes the own vehicle to travel to an evacuation place where space for other vehicles to run is present can be secured.

3. The evacuation travel assist apparatus according to claim 1, wherein, when adjacent lanes are present on both sides of the evacuation lane, the evacuation travel control section causes the own vehicle to stop in the center of the evacuation lane.

4. The evacuation travel assist apparatus according to claim 1, wherein, the evacuation place is a space for getting on and off the own vehicle can be secured, and the evacuation place changes depending on door type of the own vehicle.

\* \* \* \* \*